United States Patent
Bristow et al.

(10) Patent No.: US 8,521,808 B2
(45) Date of Patent: Aug. 27, 2013

(54) UPLOADING AND EXECUTING COMMAND LINE SCRIPTS

(75) Inventors: Basheer N. Bristow, Vail, AZ (US); David F. Mannenbach, Tucson, AZ (US); Walter J. Ramsey, Tucson, AZ (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/844,143

(22) Filed: Jul. 27, 2010

(65) Prior Publication Data
US 2012/0030272 A1 Feb. 2, 2012

(51) Int. Cl.
G06F 15/16 (2006.01)
(52) U.S. Cl.
USPC ............ 709/203; 709/217; 709/219; 709/225
(58) Field of Classification Search
None
See application file for complete search history.

(56) References Cited

U.S. PATENT DOCUMENTS

| | | | |
|---|---|---|---|
| 6,339,793 B1 | 1/2002 | Bostian et al. | |
| 7,113,989 B2 | 9/2006 | Murray et al. | |
| 7,290,263 B1 | 10/2007 | Yip et al. | |
| 7,302,568 B2 * | 11/2007 | von Behren et al. | 713/167 |
| 7,307,837 B2 * | 12/2007 | Merkin et al. | 709/238 |
| 7,581,207 B2 | 8/2009 | Bolder et al. | |
| 7,606,878 B2 | 10/2009 | Dumm | |
| 7,725,922 B2 * | 5/2010 | Pouliot | 709/202 |
| 2005/0091310 A1 * | 4/2005 | Salomon | 709/203 |
| 2007/0282964 A1 * | 12/2007 | Behrend et al. | 709/208 |

OTHER PUBLICATIONS

"Bash Guide for Beginners", "http://web.archive.org/web/20040509115933/http://tldp.org/LDP/Bash-Beginners-Guide/html/sect_02_01.html", Crawled on May 9, 2004, Accessed on Sep. 13, 2012.*
"Automation Using Templates & Scripts", ZO HO Corp, 2005-2007, 8 pages.
"Parani-MSP1000 for Wireless Multi-Serial Communications, based on Bluetooth Technology", User Guide, Version 1.0.0, last revised 2007, 66 pages.
Pernath, Wanja, "JON 2.3 Scripted Group Deployments Using the CLI API", Nov. 2009, 5 pages.
Von Laszewski, Gregor et al., "Cyberaide Shell: Interactive Task Management for Grids and Cyberinfrastructure", Service Oriented Cyberinfrastruture Laboratory, Rochester Institute of Technology, 102 Lomb Memorial Drive, Rochester, NY 14623-5608, May 18, 2009, 11 pages.

* cited by examiner

*Primary Examiner* — Thomas Dailey
*Assistant Examiner* — Nam Tran
(74) *Attorney, Agent, or Firm* — Francis Lammes; Stephen J. Walder, Jr.; Randall J. Bluestone (57) ABSTRACT

A mechanism is provided for a non-root-level user to execute command line script files via a generic command line interface. A command line interface in the data processing system receives a shellscript command from a non-root-level user via a client system. A security module in the data processing system determines whether the non-root-level user is logged on at a command line interface shell level access. Responsive to the non-root-level user being logged on at the command line interface shell level access, a storage controller at the request of a command line interface identifies a script file associated the shellscript command in a storage of the data processing system. The storage controller executes the script file and the command line interface sends the results of the execution of the script file to the non-root-level user via the client system.

20 Claims, 4 Drawing Sheets

UPLOADING AND EXECUTING COMMAND LINE SCRIPTS

BACKGROUND

The present application relates generally to an improved data processing apparatus and method and more specifically to mechanisms for uploading and executing command line scripts.

A command-line interface (CLI) is a mechanism for interacting with a computer operating system or software by typing commands to perform specific tasks. The CLI interface, which is a text-only interface, contrasts with the use of a mouse pointer with a graphical user interface (GUI) to click on options, or menus on a text user interface (TUI) to select options. This method of instructing a computer to perform a given task is referred to as "entering" a command: the system waits for the user to conclude the submitting of the text command by pressing the "Enter" key. A command-line interpreter then receives, analyses, and executes the requested command. The command-line interpreter may be run in a text terminal or in a terminal emulator window as a remote shell client. Upon completion, the command usually returns output to the user in the form of text lines on the CLI. This output may be an answer if the command was a question, or otherwise a summary of the operation.

However, in current systems, customers who want to create a new CLI or modify an existing CLI are required to send their request to a code developer who creates new code or updates existing code to support the request, creates or updates documentation to support the request, and releases a new build to the customer with the requested features. The new request may provide data to the customer that was previously only available by executing operating system commands from a root login.

SUMMARY

In one illustrative embodiment, a method, in a data processing system, is provided for a non-root-level user to execute command line script files via a generic command line interface. The illustrative embodiment receives a shellscript command from a non-root-level user via a client system. The illustrative embodiment determines whether the non-root-level user is logged on at a command line interface shell level access. The illustrative embodiment identifies a script file associated the shellscript command in a storage of the data processing system in response to the non-root-level user being logged on at the command line interface shell level access. The illustrative embodiment executes the script file and sends the results of the execution of the script file to the non-root-level user via the client system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for providing a generic command line interface (CLI) shellscript interface that allows a non-root-level user to upload and execute command line script files, thus allowing non-root-level users to define and execute their own uploaded scripts using the standard CU interface and logins without requiring a system rebuild and packaging by a root-level user.

Figure 1:
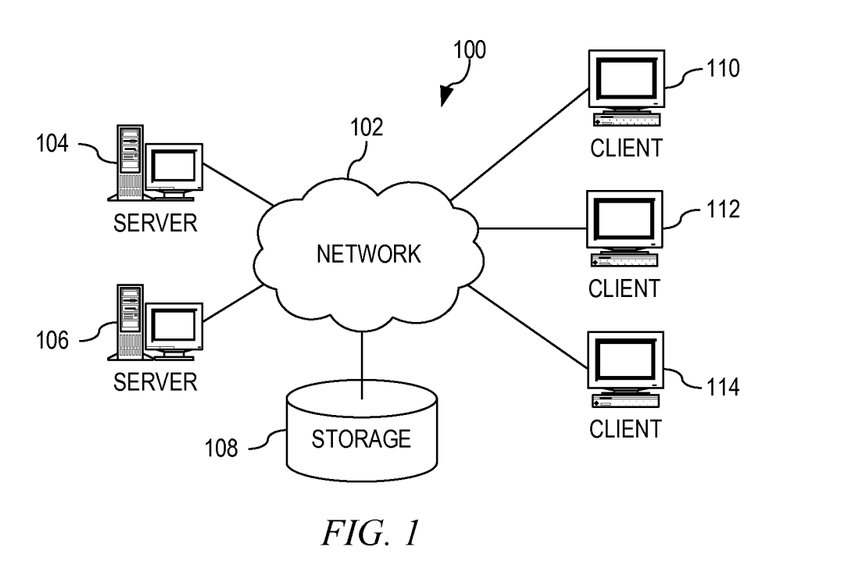
FIG. 1 depicts a pictorial representation of an example distributed data processing system in which aspects of the illustrative embodiments may be implemented.
Figure 2:
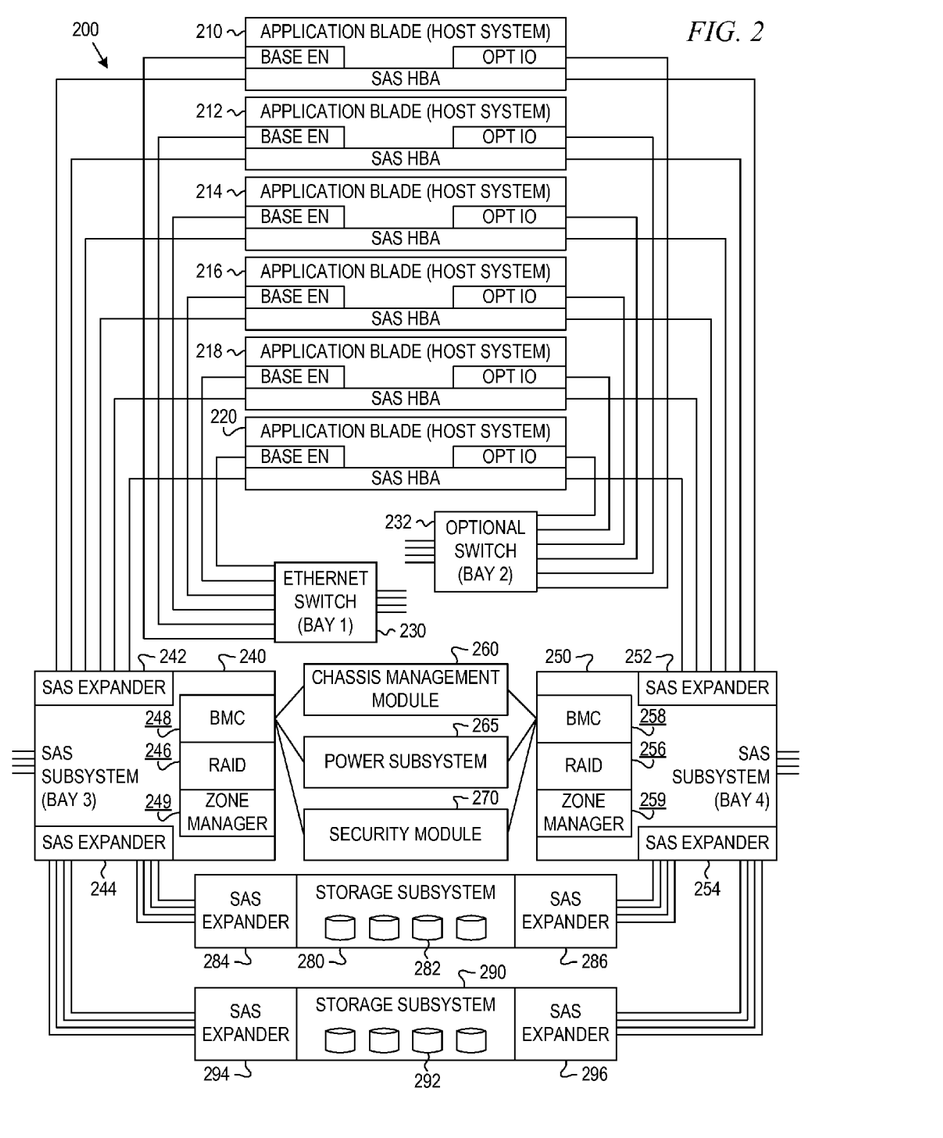
FIG. 2 shows a diagram illustrating an example of a data processing system in which aspects of illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a generic CLI shellscript interface that allows a non-root-level user to upload and execute command line script files, this is only an example and is not intended to state or imply any limitation with regard to the features of the present invention. To the contrary, the illustrative embodiments are intended to include distributed data processing environments and embodiments in which a non-root-level user may upload and execute command line script files through a generic CLI shellscript interface.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a diagram illustrating an example of a data processing system is shown in which aspects of illustrative embodiments may be implemented. As shown in FIG. 2, the data processing system may be provided in a chassis 200, such as a BladeCenter® chassis available from International Business Machines Corporation of Armonk, N.Y. Within the chassis 200, a plurality of host servers or host systems may be provided on application blades 210-220. Each host servers 210-220 may have one or more input/output adapters including a base Ethernet (base EN) adapter for communication with an Ethernet switch 230, an optional I/O (opt I/O) adapter for communication with an optional switch 232, and SAS host bus adapter (SAS HBA) for communication with SAS subsystems 240 and 250. In addition to these elements, a chassis management module 260, power subsystem 265, and security module 270 may be provided within the chassis 200 for performing various management, power, and security functions. The elements of the chassis 200 communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses SAS to communicate between the application blades 210-220 and the storage subsystems 280 and 290 via the SAS subsystems 240 and 250.

The SAS subsystems 240 and 250 operate as switches in the SAN fabric and controllers for accessing the storage subsystems 280 and 290. As shown in FIG. 2, the storage subsystems 280 and 290 are comprised of a plurality of storage devices 282 and 292, respectively, which are accessed via one or more SAS expanders 284, 286, 294, and 296. The storage devices 282 and 292 may comprise a single disk drive, tape drive, optical drive, or a plurality of such storage devices, such as in a disk array. For example, the storage device 282 may comprise a disk array, such as a Redundant Array of Independent Disks (RAID) system with the disk devices in the RAID system being Just a Bunch of Disks (JBOD) devices and/or Switched Bunch of Disks (SBOD) systems.

The SAS subsystems 240 and 250 may themselves comprise a host side SAS expander 242, 252, and a storage subsystem side SAS expander 244, 254. The SAS expanders 242, 244, 252, 254, 284, 286, 294, and 296 may be configured to support zoning. Moreover, the SAS subsystems 240 and 250 may further comprise storage subsystem controllers, such as RAID controllers 246 and 256, blade management controllers (BMC) 248 and 258, and at least one zone manager 249 and 259. The RAID controllers 246 and 256 perform various control operations for controlling operation and access to the storage subsystems 280 and 290. The BMCs 248 and 258 perform various management operations for managing the application blades 210-220 of the chassis 200. The BMCs 248 and 258 may communicate with the chassis management module 260 to obtain vital product data (VPD) for the various application blades 210-220 and storage subsystems 280 and 290.

As seen in FIG. 2, chassis 200 may contain many multiple function components, such as application blades, SAS subsystems, storage subsystems, and the like. These multiple function components may be embodied in a blade or other self-contained package that is easily removed and replaced. A multiple function component may take the form of a customer replaceable unit (CRU), which is a circuit board, part, or assembly that can be quickly and easily removed from a data processing system or other piece of electronic equipment and replaced by the customer or a technician without having to send the entire product or system to a repair facility. For example, a blade may have its own CPU, memory, and hard disk, where each function within the blade may operate independently.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system without departing from the spirit and scope of the present invention.

Figure 3:
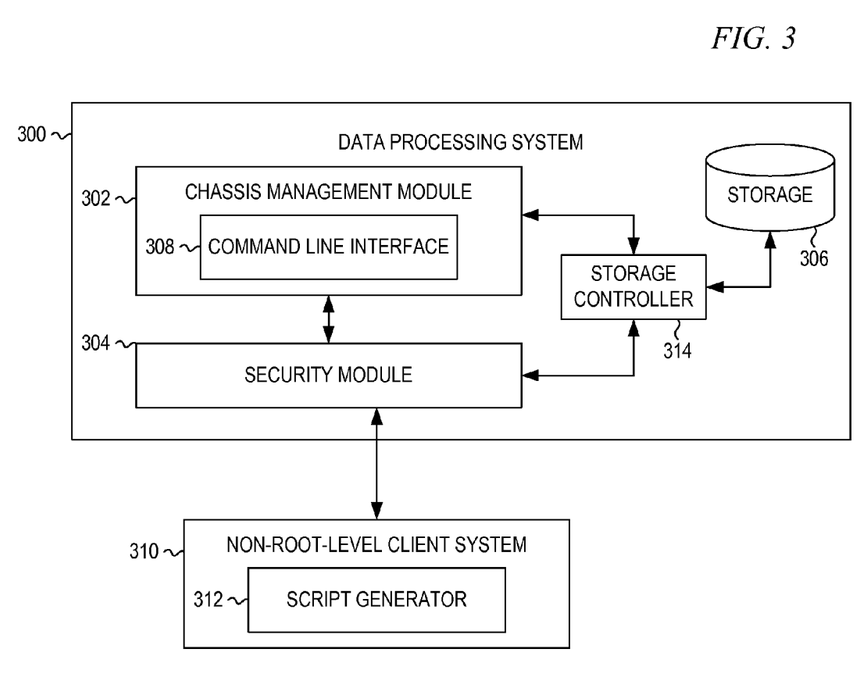
FIG. 3 illustrates a functional block diagram for providing a generic command line interface (CLI) shellscript interface that allows a non-root-level user to upload and execute command line script files in accordance with the illustrative embodiments.

FIG. 3 illustrates a functional block diagram for providing a generic command line interface (CLI) shellscript interface that allows a non-root-level user to upload and execute command line script files in accordance with the illustrative embodiments. Data processing system 300, such as data processing system in chassis 200 of FIG. 2, may comprise chassis management module 302, security module 304, and storage 306. Chassis management module 302 may further comprise command line interface 308 which may be accessed by root-level users and non-root-level users, such as a non-root-level user of non-root-level user client system 310. As previously discussed, currently when a customer or non-root-level user wants a new script, the non-root-level user would either have to have root access to write their own script, which is generally not provided since other customer's machine security would be compromised, or the non-root-level user would have to submit a request to a root-level user for CLI code modification that requires documentation and definition of the new script and creation of new documentation and new code releases. The illustrative embodiments provide for a non-root-level user to use script generator 312 on non-root-level user client system 310 to generate a new script or modify an existing script. The script or scripts generated or modified by the non-root-level user may be of variable lengths and may have any number of input parameters.

Script generator 312 may assist the non-root-level user in generating and/or modifying scripts that conform to the specific requirements of command line interface 308. The new or modified scripts may comprise input/output (I/O) commands, operating system commands, CLI commands, or the like. Once the non-root-level user has generated or modified a script, the non-root-level user may upload the new or modified script to storage 306. The new or modified script may be uploaded using any type of file transfer protocol, such as Hypertext Transfer Protocol (HTTP), File Transfer Protocol (FTP), User Datagram Protocol (UDP)-based file transfer protocol (UFTP), or any known or later developed file transfer protocol without architectural limitation.

The uploading of the new or modified script to storage 306 may be controlled by security module 304. Security module 304 may require that the user have at least a level of CLI system access in order to upload the new or modified script which may be a different level of access as compared to the level of access required to execute the new or modified script. However, in order to actually execute the new or modified script, the non-root-level user may have to access command line interface 308 using a CLI shell level username and password, which is at least a level of access above CLI system access and at least a level below a CLI root-level access.

Once security module 304 has authorized the non-root-level user's CLI shell level access, the non-root-level user may execute the new or modified script using a command which the illustrative embodiments define as a new command for command line interface 308. The new command is as follows:

shellscript -file name [-param "ANYSTRING"]

where the '-file name' parameter is a required parameter that specifies which file (script) stored in storage 306 is to be executed. Command line interface 308 passes the name of this file as specified to storage controller 314 associated with storage 306 for file retrieval. This way the user can pass any file (script) name to storage controller 314, which retrieves the script from storage 306 and then executes the script. The '-param' parameter is optional. ANYSTRING should be enclosed in quotes. The '-param' string may have any printable characters including spaces. This '-param' string is passed as is to the script execution. If this option is not specified, command line interface 308 would pass a NULL string in the '-param' parameter.

The newly defined shellscript CLI command allows users to dynamically execute their own uploaded shellscript files (new files or modifications of existing files) and also to specify input parameters when executing the shell scripts. All scripts shall be required to run in a restricted shell environment as a non-root-level user. This is to prevent the abuse of this functionality and allows for the protection of the subsystem environment.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
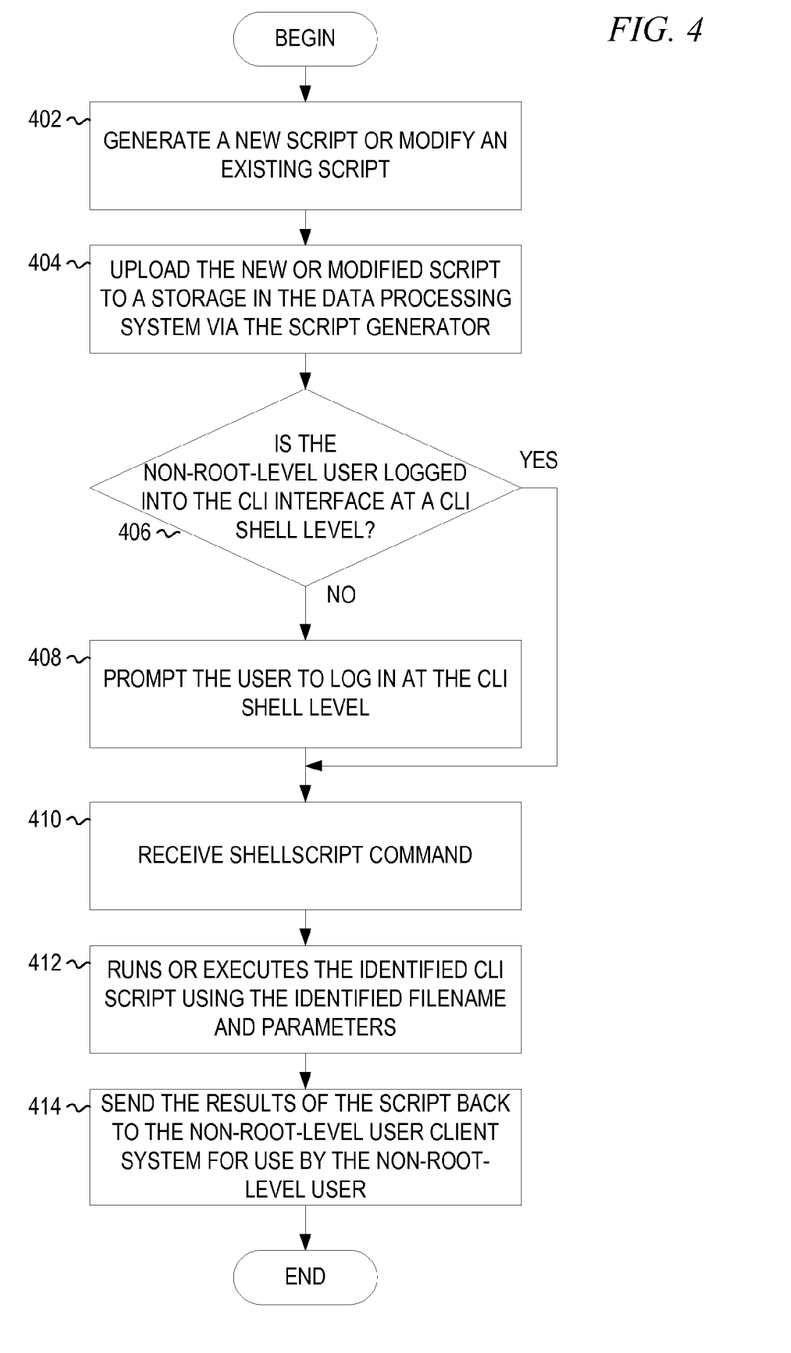
FIG. 4 provides a flowchart outlining example operations of a non-root-level user executing command line script files via a generic command line interface (CLI) shellscript interface in accordance with the illustrative embodiments.

Referring now to FIG. 4, this figure provides a flowchart outlining example operations of a non-root-level user executing command line script files via a generic command line interface (CLI) shellscript interface in accordance with the illustrative embodiments. As the operation begins, a non-root-level user uses a script generator on non-root-level user client system to generate a new script or modify an existing script (step 402). The script or scripts generated or modified by the non-root-level user may be of variable lengths and may have any number of input parameters. Once the non-root-level user completes generating or modifying the script, the non-root-level user may upload the new or modified script to a storage in the data processing system via the script generator (step 404).

Once the new or modified script has been uploaded, the non-root-level user may then attempt to execute the new or modified script. In response to an attempt to execute the new or modified script, a security module within the data processing system determines whether the non-root-level user is logged into the CLI interface at a CLI shell level (step 406). If at step 406 the non-root-level is not logged onto the command line interface at the CLI shell level, then the security module prompts the user to log in at the CLI shell level (step 408). If at step 406 the non-root-level is logged onto the command line interface at the CLI shell level or from step 408, the non-root-level user inputs the new command to the command line interface in the following form:

shellscript -file name [-param "ANYSTRING"]

where the '-file name' parameter is a required parameter that specifies which file (script) stored in the storage that is to be executed and '-param' parameter, which is optional, provides additional variables to be used by the script during execution (step 410).

With the script identified, a storage controller retrieves the script from storage at the request of the command line interface and then runs or executes the identified CLI script using the identified filename and parameters (step 412). Once the script has been executed, the command line interface sends the results of the script back to the non-root-level user client system for use by the non-root-level user (step 414), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a non-root-level user to upload and execute command line script files via a generic command line interface (CLI) shell-script interface that allows non-root-level users to define and execute their own uploaded scripts using the standard CLI interface and logins without requiring a system rebuild and packaging by a root-level user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for a non-root-level user to execute command line script files via a generic command line interface, the method comprising:
    receiving, in a command line interface in the data processing system, a shellscript command from a non-root-level user via a client system;
    determining, by a security module in the data processing system, whether the non-root-level user is logged on at a command line interface shell level access, wherein the command line interface shell level access is at least a level of access above command line interface system access and at least a level of access below command line interface root-level access;
    responsive to the non-root-level user being logged on at the command line interface shell level access, identifying, by a storage controller at the request of a command line interface, a script file associated with the shellscript command in a storage of the data processing system, wherein the script file is either a new script file or a modified script file uploaded by the user without root-level access, without root-level user assistance, and without requiring a rebuild and packaging by the root-level user;
    executing, by a storage controller, the script file; and
    sending, by the command line interface, the results of the execution of the script file to the non-root-level user via the client system.

2. The method of claim 1, wherein the script file is generated by the non-root-level user on the client system.

3. The method of claim 1, wherein the script file is uploaded from the client system to the data processing system using a file transfer protocol.

4. The method of claim 3, wherein the script file is uploaded using a different level of user access from the command line interface shell level access.

5. The method of claim 1. wherein the shellscript command is of the form:

shellscript -file name [-param "ANYSTRING"]

wherein the '-file name' parameter is a required parameter that specifies the script file that is to be executed and wherein the '-param' parameter is optional to execute the shellscript command and provides additional variables to he used by the script during execution.

6. The method of claim 1, further comprising:
    responsive to the non-root-level user failing, to be logged on at the command line interface shell level access, prompting, by the security module, the non-root-level user to log in at a command line interface shell level;
    responsive to the user logging in at the command line interface shell level, identifying, by the storage controller at the request of a command line interface, the script file associated with the shellscript command in the storage of the data processing system, wherein the script file is either a new script file or a modified script file uploaded by the user without root-level access, without root-level user assistance, and without requiring a rebuild and packaging by the root-level user;
    executing, by the storage controller, the script file; and
    sending, by the command line interface, the results of the execution of the script file to the non-root-level user via the client system.

7. The method of claim 1, wherein the data processing system is a blade center.

8. A computer program product comprising a computer readable storage medium having a computer readable program stored therein, wherein the computer readable program, when executed on a computing device, causes the computing device to;
    receive a shellscript command from a non-root-level user via a client system;
    determine whether the non-root-level user is logged on at a command line interface shell level access, wherein the command line interface shell level access is at least a level of access above command line interface system access and at least a level of access below command line interface root-level access;
    responsive to the non-root-level user being logged on at the command line interface shell level access, identify a script file associated with the shellscript command in a storage, wherein the script file is either a new script file or a modified script file uploaded by the user without root-level access, without root-level user assistance, and without requiring a rebuild and packaging by the root-level user;
    execute the script file; and
    send the results of the execution of the script file to the non-root-level user via the client system.

9. The computer program product of claim 8, wherein the script file is generated by the non-root-level user on the client system.

10. The computer program product a claim 8, wherein the script file is uploaded from the client system to the data processing system using a file transfer protocol.

11. The computer program product of claim 10, wherein the script file is uploaded using a different level of user access from the command line interlace shell level access.

12. The computer program product of claim 8, wherein the shellscript command is of the form:

shellscript -file name [-param "ANYSTRING"]

wherein the '-file name' parameter is a required parameter that specifies the script file that is to be executed and wherein the '-param' parameter is optional to execute the shellscript command and provides additional variables to be used by the script during execution.

13. The computer program product of claim 8, wherein the computer readable program further causes the computing device to:
    responsive to the non-root-level user failing to be logged on at the command line interface shell level access, prompt the non-root-level user to log in at a command line interface shell level;
    responsive to the user logging in at the command line interface shell level, identify the script file associated with the shellscript command in the storage, wherein the script file is either a new script file or a modified script file uploaded by the user without root-level access, without root-level user assistance, and without requiring a rebuild and packaging by the root-level user;
    execute the script file; and
    send the results of the execution of the script file to the non-root-level user via the client system.

14. The computer program product of claim 8, wherein the computing device is a blade center.

15. An apparatus, comprising:
    a processor; and a memory coupled to the processor, wherein the memory comprises instructions which, when executed by the processor, cause the processor to:

receive a shellscript command from a non-root-level user via a client system;

determine whether the non-root-level user is logged on at a command line interface shell level access, wherein the command line interface shell level access is at least a level of access above command line interface system access and at least a level of access below command line interface root-level access;

responsive to the non-root-level user being logged on at the command line interface shell level access, identify a script file associated with the shellscript command in a storage, wherein the script file is either a new script file or a modified script file uploaded by the user without root-level access, without root-level user assistance, and without requiring a rebuild and packaging by the root-level user;

execute the script file; and send the results of the execution of the script file to the non-root-level user via the client system.

16. The apparatus of claim 15, wherein the script file is generated by the non-root-level user on the client system.

17. The apparatus of claim 15, wherein the script file is uploaded from the client system to the data processing system using a file transfer protocol.

18. The apparatus of claim 17, wherein the script file is uploaded using a different level of user access from the command line interface shell level access.

19. The apparatus claim 15, wherein the shellscript command is of the form:

shellscript -file name [-param "ANYSTRING"]

wherein the '-file name' parameter is a required parameter that specifies the script file that is to be executed and wherein the '-param' parameter is optional to execute the shellscript command and provides additional variables to be used by the script during execution.

20. The apparatus of claim 15, wherein the instructions further cause the computing device to:

responsive to the non-root-level user failing to be logged on at the command line interface shell level access, prompt the non-root-level user to log in at a command line interface shell level;

responsive to the user logging in at the command line interface shell level, identify the script file associated with the shellscript command in the storage, wherein the script file is either a new script file or a modified script file uploaded by the user without root-level access, without root-level user assistance, and without requiring a rebuild and packaging by the root-level user;

execute the script file; and send the results of the execution of the script file to the non-root-level user via the client system.

* * * * *